March 11, 1958 — J. E. LILIENFELD — 2,826,724
ELECTROLYTE AND NOVEL CAPACITOR UTILIZING THE SAME
Filed Sept. 4, 1953 — 4 Sheets-Sheet 1
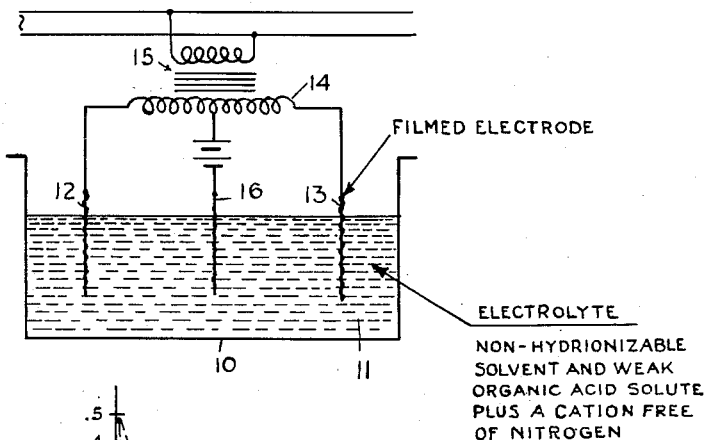
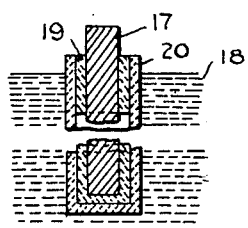
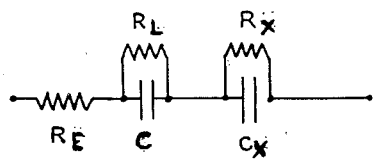
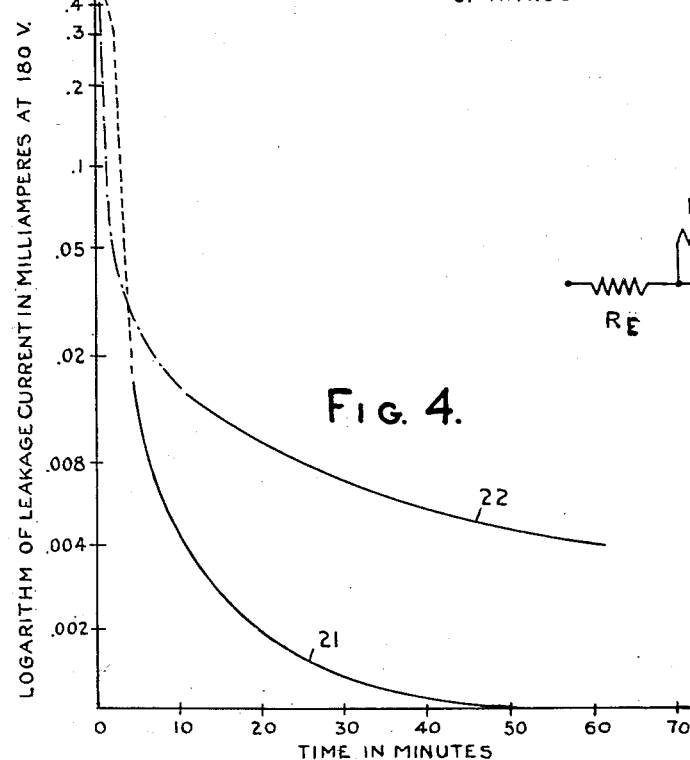
INVENTOR
JULIUS EDGAR LILIENFELD
BY /Holcombe Wittwill & Briesbois/
ATTORNEYS.

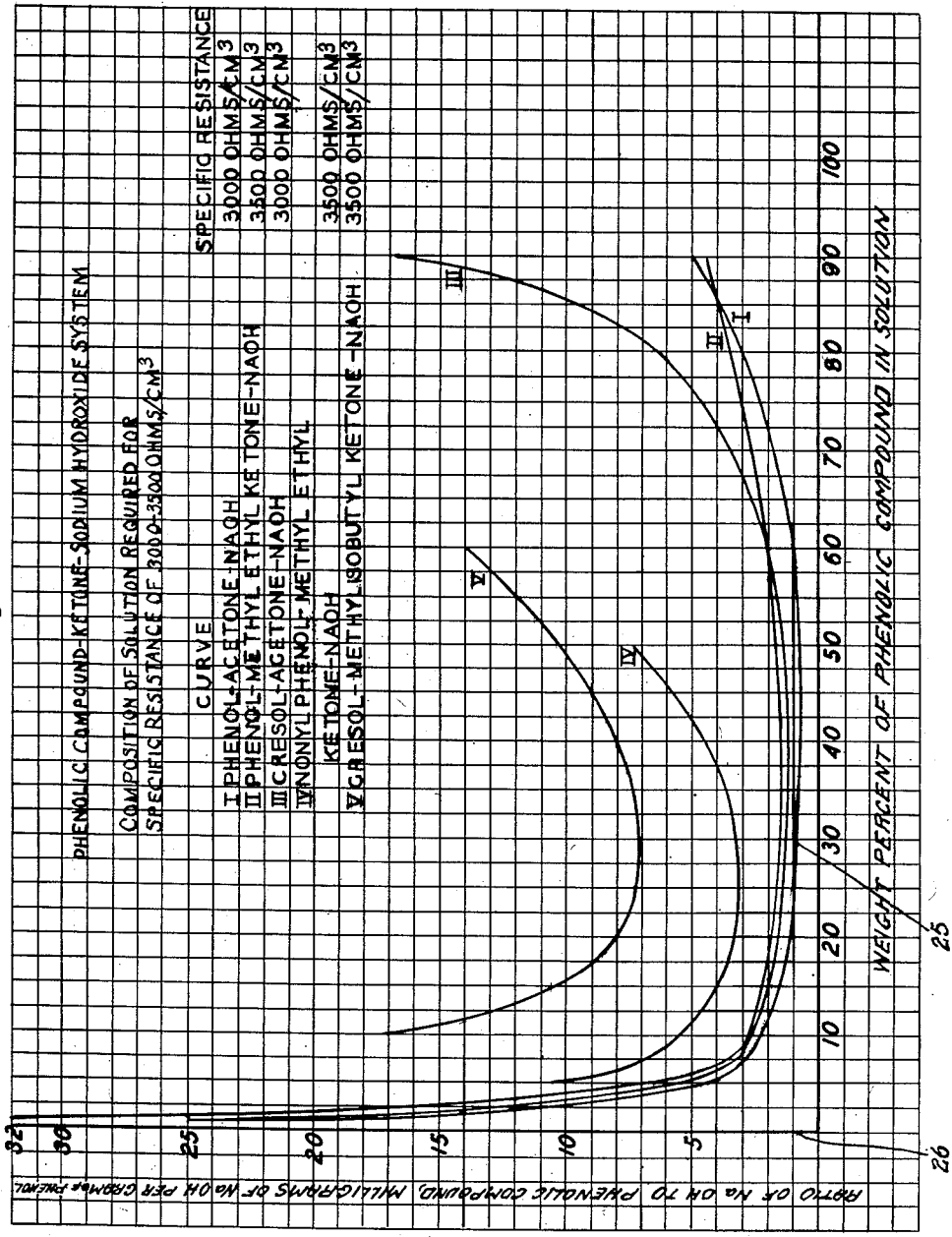

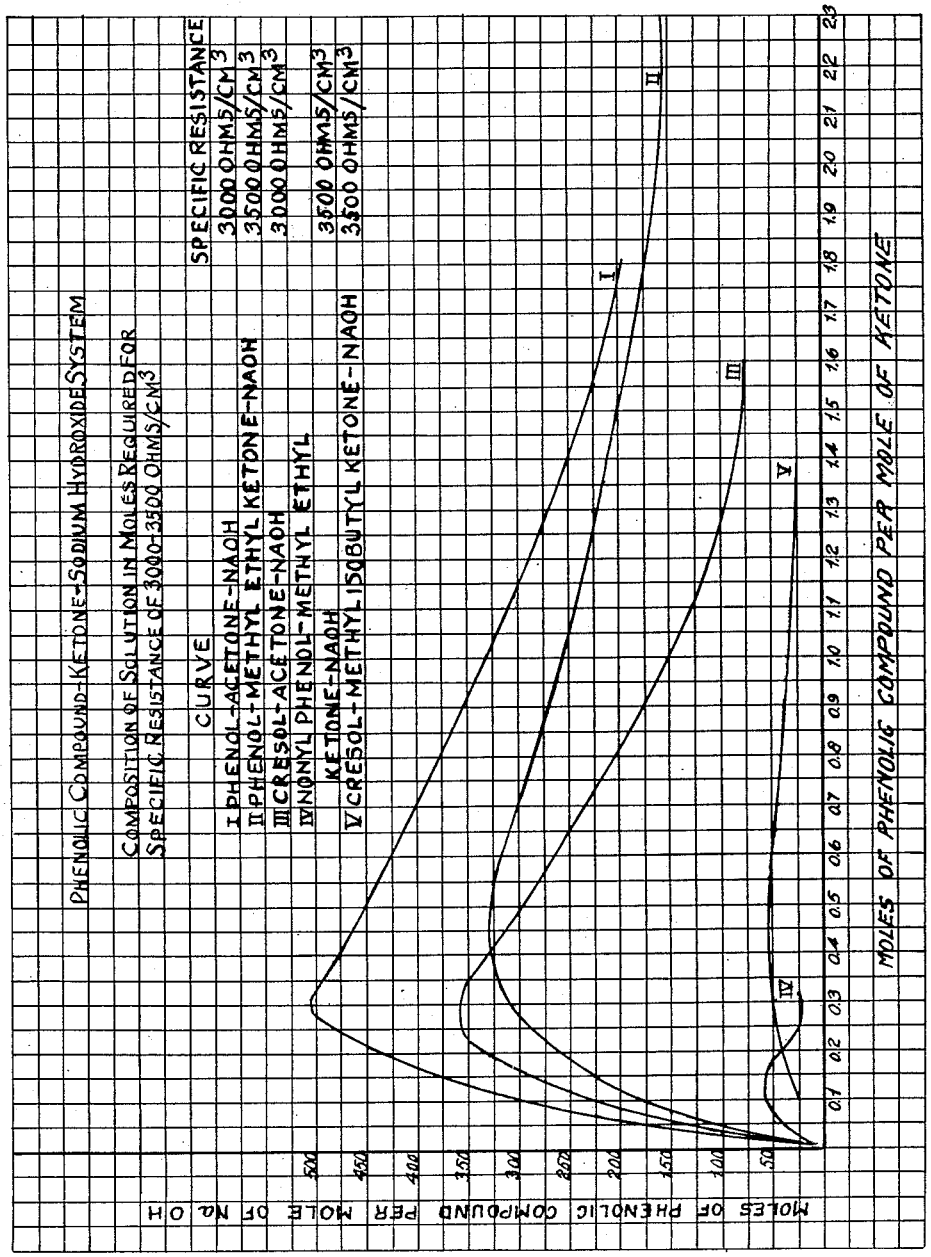

United States Patent Office
2,826,724
Patented Mar. 11, 1958

2,826,724

ELECTROLYTE AND NOVEL CAPACITOR UTILIZING THE SAME

Julius E. Lilienfeld, St. Thomas, Virgin Islands, assignor to Samuel D. Warren, Essex, Mass., and Ralph F. Burkard, Arlington, Mass., jointly Application September 4, 1953, Serial No. 378,570

18 Claims. (Cl. 317—230)

The invention relates to a class of novel electrolytes for forming anodized films on metals, such as aluminum, magnesium, tantalum, zinc, copper, etc., and particularly to the formation therein of films of the low-leak high-resistance (dielectric) type. It relates also to an electrolytic capacitor having novel properties when operated with said electrolyte.

One object of the invention is to provide an electrolyte which will safeguard the metal bodies (electrodes) subject to formation therein against corroding, particularly at the surface of the electrolyte—commonly known as "necking"—as well as to obviate other detrimental actions of the anodizing process upon said metals.

Another object of the invention is to accelerate the formation of the anodized film, and to reduce substantially the amount of the final leakage current once the formation to a given maximum voltage has been carried through to its completion.

A further object of the invention is to provide an electrolyte in which may be anodized such metals as are known otherwise not to be satisfactorily or efficiently filmable in conventional electrolytes, especially such metals as have heretofore been considered unfit for anodizing purposes.

The invention has for an object, also, the provision of an electrolyte which will make it feasible to use rubber, particularly live rubber, for example, as an element in the sealing support of a capacitor comprising the anodized electrodes and the electrolyte.

Another object is to provide a freely circulable electrolyte of low viscosity in order to obviate local overheating and to provide for adequate cooling of larger capacitor units.

Still another object of the invention is to provide an electrolytic capacitor operable throughout a wide range of temperatures including low temperatures—of the order of arctic temperatures—and with minimum loss of capacity and power.

A further object of the invention is to provide an electrolytic capacitor which, when operated on alternating current power lines, will have a relatively low power loss and wherein the capacity and power loss will be stabilized over long periods of active use.

A still further object of the invention is to provide a capacitor of which the leak does not substantially increase in idling and so to avoid the otherwise recurrent necessity for a partial reforming operation.

In the operation of the conventional type of electrolytic capacitors on alternating voltages, it is known that neither the capacity nor the power loss is stabilized over long periods of time and that the latter progressively increases until it reaches prohibitive values. My research in this field led me to the conclusion that it is the hydrated stratum of the film, adjacent the film-electrolyte interface, which causes most of the power loss; and that the progressive development of hydration at the interface causes the aforesaid instability.

In carrying out my invention, it is proposed, therefore, to make use of electrolytes which stabilize the interface stratum so as to afford the minimum feasible power loss.

The hydration of the film is synonymous with the interaction of the oxide of the film with hydroxyl groups yielded by the electrolyte. Consequently, it is in effect this interaction which must be limited and stabilized. Thus, the electrolyte has to be anhydrous and of such nature as not to yield hydroxyl groups in uncontrollable profusion. Such an electrolyte is hereinafter referred to as substantially anhydrous.

The known electrolytes do not possess this feature, inasmuch as they either have an uncontrolled moisture content by virtue of which they acquire conductivity; or a similar content of organic solvents with an OH group in their molecule, such as various alcohols. It is also to be noted that the prior art does not indicate that any attempt has been made to use said alcohols free of water in the operation of electrolytic capacitors with a view to improve their performance, which is only natural because the detrimental effect of water was not recognized. When these alcohols are used with boric acid and possibly some borax which, by the very fact of being dissolved therein, unavoidably produce a substantial amount of water, this water cannot be eliminated because it is determined by the chemical equilibrium establishing itself. As solutes ammonium and organic radicals containing nitrogen have been proposed but these have been found by me to be useless in capacitor technology, and I utilize as solutes only substances which are free from nitrogen.

The novel liquid electrolytes, and capacitors operating therewith, are consequently designed with organic liquids as solvent means which are of a class termed herein "non-hydrionizable." By this term I wish to convey that said solvents as such have a conductivity low enough to classify them as insulators and when mixed with water still retain this classification. As suitable solvents are indicated organic solvents which contain at least one oxygen atom in the molecule, for instance, ketones such as acetone, methyl ethyl ketone, methyl isobutyl ketone, benzophenone, acetophenone, etc.; also certain aldehydes such as butyraldehyde and propyl aldehyde, and ethers such as anisole. These solvents have the distinctive property that by dissolving in them, as solute means, an organic acid only, or a base only, a sufficient conductivity cannot be obtained for satisfactory performance as an electrolyte.

For instance, a given relatively minor concentration of sodium hydroxide only in water will result in an electrolyte having the low specific resistance of 720 ohms, while the same concentration of sodium hydroxide in acetone will produce the high resistance of 258,000 ohms. Similarly, a given minor concentration of phenol only in water will produce the resistance of 30,900 ohms, while the same concentration in acetone will make the resistance 211,500 ohms. However, by combining the said concentrations of sodium hydroxide and of phenol, the resistance in acetone drops to 2,190 ohms and that in water increases to 1,800 ohms. It may be observed from the foregoing that in using acetone as solvent, combining of the two solute components decreases the high resistances to a very great extent, while in using water as solvent, the resistances with either one solute component only are relatively low, but in combining the solute components the resistance increases slightly.

Therefore, in compounding the novel electrolyte, solvent means of the aforesaid nature are to be combined with a solute comprising components of both classes—weak organic acids and bases as cationogens. The latter term refers to a substance which produces positive ions when in solution; and I have found that a minor quantity thereof will produce the desired conductivity provided a correspondingly adequate quantity of acid is present. With respect to the cationogens, I have found alkalis—such as sodium, potassium, lithium, etc., which form salts with the weak organic acids—to be suitable.

By thus combining, in the non-hydrionizable liquid solvent, suitable cationogens with said acids, a substantially anhydrous electrolyte is produced. An important feature of the invention appears thus to reside in the use of a solvent which is free of OH groups but contains an O atom in its molecule.

In order to compound an electrolyte with the three aforesaid components which would be most advantageous in the operation of a capacitor, it is to be noted that, primarily, said electrolyte should have a predetermined specific resistance, to comply with conditions as established by the mechanical design and other technical features. A predetermined resistance, however, is not a sufficient condition to define the relative concentrations. Indeed, it is possible, within a wide range, arbitrarily to take any concentration of the acid component and then to find a corresponding concentration of the alkali component such as to result in a definite specific resistance of the compound. Yet, not all such compounds with an equal resistance are suitable for use, and I found that to provide a suitable electrolyte it must be compounded within a narrow range. This range is determined by a function peculiar to the specific solvent-acid-alkali system which is intended for use.

In an electrolyte of this nature, films may be formed not only on aluminum or tantalum, but also on such metals as do not allow ordinarily films, especially films of an adequate dielectric nature, to be formed thereon by conventional methods, for example, on metals such as magnesium, zinc, copper, etc.

The nature of the invention, however, will best be understood when described in connection with the accompanying drawings, in which:

Fig. 1 is a diagrammatic representation of the novel electrolytic capacitor.

Fig. 2 is a fragmentary vertical section through a filming metal electrode with the films shown on a greatly enlarged scale.

Fig. 3 shows the electrodynamic equivalent under conditions prevailing in the showing, Fig. 2.

Figure 6:
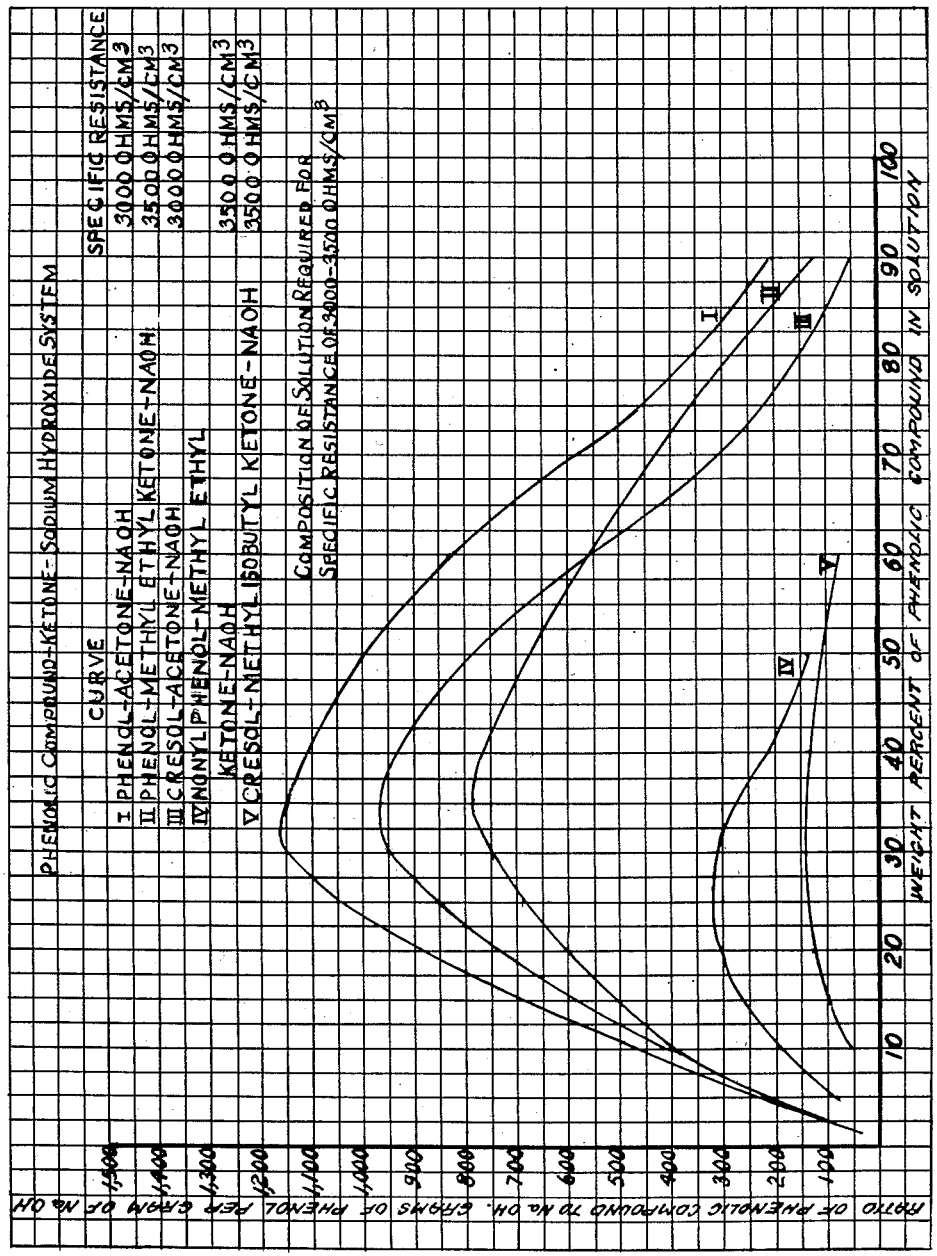

Fig. 4 shows comparative graphs, the divisions on the axis of ordinates being logarithms of milliamperes of the leakage current, while the abscissae correspond to formation time in minutes—the broken-line portions representing the rapid fall of the leakage current upon commencement of formation. The graphs illustrate the progress of film formation versus leakage current in two electrolytes—one using as solvent water and the other, substantially water free acetone, the solute in both examples being of the same concentration and the same constituents, to wit: phenol plus sodium hydroxide, as set forth herein.

Figs. 5, 6 and 7 are further graphs illustrating the functional relationships between ratios of concentrations of the components of the electrolyte system.

Referring to Fig. 1 of the drawings, a suitable container 10 is provided for the electrolyte 11 in which are immersed the two (twin) electrodes 12 and 13 of filmable metal such as aluminum, tantalum, etc. The consistency of the electrolyte must be such that it will be a non-viscous liquid of a circulable nature, operable at low temperatures; and thus such as to permit of the dissipation of heat generated in the operation of capacitors of commercial sizes by the effect known as thermosyphon cooling, for example, as is set forth in my copending application for United States Letters Patent, Serial No. 272,394, filed February 19, 1952, now Patent No. 2,742,596.

The respective electrodes are connected in series to opposite terminals in an A. C. network, for example to the secondary winding 14 of a transformer 15 operated on the network. The said two electrodes (anodes) 12 and 13 are maintained always positive with respect to the electrolyte 11, as is well understood in the art, by biasing the electrolyte negatively through a further electrode 16.

Regarding the nature of the electrolyte 11, it has been indicated that it is essential that this be substantially anhydrous and comprise a low conductivity, non-hydrionazable liquid solvent of an organic nature.

For a better understanding of the invention, reference is made to a paper entitled "Distribution of Conductivity Within the Dielectric Film on Aluminum" presented to The Electrochemical Society at its Fiftieth Anniversary Meeting; and wherein, as a result of careful investigations, there is set forth a proper foundation to introduce the concept of interface conditions.

Briefly, the conclusion is drawn that the anodized film consists of strata of two different kinds. The stratum of the first kind, immediately adjacent to the filmable electrode metal, is made up of a superior dielectric having negligible power loss, its thickness being proportional to the formation voltage. The stratum of the second kind, which I term the "interface" stratum, is interposed between the electrolyte and the stratum of the first kind.

The thickness of the interface stratum is not simply a function of the formation voltage. It consists, furthermore, of a substance which is far from being a good dielectric, has a varying, relatively low specific resistance, and is responsible for the high power loss and the instability in operation of heretofore known capacitors.

My aforesaid theoretical conception of the filmed electrode is illustrated in Fig. 2 wherein 17 represents an electrode immersed in electrolyte 18, with the stratum of the first kind indicated at 19 and that of the second kind indicated at 20. Such an electrode, when operated in an electrolytic capacitor, becomes part of an electrodynamic entity equivalent to the circuit, shown in Fig. 3, the resistance indicated at $R_E$ being that of the electrolyte 18; C indicating the capacity of the stratum 19; and $C_X$, that of the interface stratum 20. $R_L$ represents the resistance parallel to C, which is very large and is commonly known as the "leakage resistance." $R_X$ represents the relatively low resistance paralleling $C_X$. By the nature of the electrolyte and by narrow spacing of the electrodes, $R_E$ may be maintained adequately small.

Thus, the power loss is to a very large extent due to the interface quantities $R_X$ and $C_X$; and the instability of the condensers heretofore constructed is caused by the variations of those quantities. My further research points to the fact that it is the progressive hydration of the interface stratum which produces said variations and thus indicates that it is desirable to control the concentration of the OH ions in the electrolyte 18. Therefore, water and alcohols should not be used as solvents in a capacitor electrolyte.

I have found that, having thus selected solvent and solutes, a chemical system becomes defined comprising three components of which the respective three concentrations form a definite function of three variables, and the task arises to determine the specific relative concentrations of said components such as to warrant the most desirable performance of the capacitor. Inasmuch as the specific resistance of the electrolyte requires a definite value, to accommodate the mechanical design and other technical features of the capacitor makeup, the relations between the aforesaid concentrations become a function of two variables, which may be variously represented. I prefer to consider the ratio:

$$\frac{\text{Quantity of alkali component}}{\text{Quantity of acid}}$$

(or its reciprocal) as a function of the ratio:

$$\frac{\text{Quantity of acid}}{\text{Quantity of solvent}}$$

(or its reciprocal).

Graphs of functions for various systems are presented in Figs. 5, 6, and 7. Typically, each such function has an extremum-minimum or maximum; and I have discovered that by far the most desirable compositions of the electrolyte for commercial use, especially continuous use on alternating current for power factor correction, are to be found in the immediate neighborhood of said minimum (or maximum). Thus, the amount of acid, expressed in weight or moles, to be combined with an arbitrarily chosen amount of solvent may be read off the abscissa of an aforesaid graph; and the corresponding amount of the alkali component may be read off the ordinate.

The solvents are to be found among organic compounds containing O in the molecule but no OH group. For example, the following solvents have been found to give satisfactory results, viz: ketones, such as acetone, methyl ethyl ketone, methyl isobutyl ketone, benzophenone and acetophenone, etc.; also aldehydes such as butyraldehyde, propyl aldehyde, and ethers such as anisole. With such solvent is to be combined a solute comprising components of two classes—weak organic acids and one of the inorganic alkali bases excluding ammonium. As a suitable organic acid (an ionogen), I prefer an acid of the aromatic class including phenol, nonyl phenol, other phenols; also cresol, para, ortho and meta cresol, xylenol, salicylic acid, etc.; and as a cationogen, alkalis such as sodium, potassium, lithium, etc., may be utilized. It is to be understood, however, that the acid component is to be in excess.

By referring to Figs. 5, 6 and 7, representative graphs are shown respectively of the ratio of sodium hydroxide, as a representative and effective cationogen, to phenolic compounds to various solvents such as ketones, the first-named ratios being plotted as ordinates and the corresponding latter ratios as abscissae. It will be noted that each curve has a minimum, Fig. 5, or a maximum, Figs. 6 and 7, which I have found to afford a means for determining the most satisfactory ratios. Reference being had to said graphs, Figs. 5 to 7, inclusive, the curve I (phenol-acetone-sodium hydroxide) shows a minimum at approximately the ratio value 30 (indicated by the reference character 25). If, now, the corresponding ordinate value be read, it will afford the ratio of sodium hydroxide to phenolic compound, viz: 0.8 milligrams per gram of phenol (indicated by the reference character 26). From these, the actual amounts of the respective components set forth in the hereinbefore noted example are readily determined.

Generally, it is preferred to utilize graphs, Figs. 6 and 7, in which the ratios are the reciprocals of those shown in Fig. 5, since a more critical point (maximum) is thereby attained. Thus, as is shown in Fig. 6, the corresponding curve I shows a maximum value of 30, with corresponding ordinate value of approximately 1150.

Instead of plotting the ratios according to actual weights of the components, mole ratios may be plotted, as is indicated in Fig. 7 of the drawings, for the various minimums and maximums shown in Figs. 5 and 6.

From these graphs, Figs. 5, 6 and 7, it is evident that there is a wide range of proportions of the respective components of my improved electrolyte which will give acceptable performance. Referring to Fig. 6, for example, the ratio of the acid phenolic compound to sodium hydroxide varies from 50/1 to 1150/1; and the ratio of the acid phenolic compound to the solvent and alkali varies so that the acid phenolic compound constitutes not less than 2½% and not more than 90% of the total mixture by weight, depending upon the substances used, the proportions between the amount of the solvent component, the amount of alkali and the amount of phenolic compound being such as to produce a specific resistance of from 3000 to 3500 ohms per cubic centimeter.

The following examples are illustrative of various chemical systems according to the aforesaid rule and which afford suitable compositions of solvent and solute components constituting the novel electrolyte, the alkali base component in each being sodium hydroxide (or metallic sodium equivalent):

|  | Gms. |
|---|---|
| Phenol or cresol (U. S. P.) | 150 |
| Acetone (U. S. P.) | 350 |
| Sodium hydroxide (U. S. P.) | 0.128 |

The organic component is placed in a beaker of suitable size and the solvent added thereto and thoroughly mixed therewith as by stirring. A 33% aqueous solution of the sodium hydroxide is then added to the mixture with constant stirring until complete solution thereof is attained. The water unavoidably introduced into the system with the sodium hydroxide is so small in quantity that it has no significant effect on the system.

Instead of using acetone as the solvent component, other ketones such as methyl ethyl ketone have been found suitable; and in the proportion of 325 grams of said solvent to 175 grams of phenol and 0.224 gram of sodium hydroxide.

Also, nonyl phenol may be substituted for the phenol in the proportions of 125 grams thereof to 375 grams of the acetone and 0.19 gram of the sodium hydroxide. This applies also to the use of the nonyl phenol with methyl ethyl ketone but with about double the amount of sodium hydroxide used.

As a further ketone solvent, I have found methyl isobutyl ketone very satisfactory, the proportions, for example with cresol as the organic solute and sodium hydroxide as the alkali, then being:

|  | Grams |
|---|---|
| Cresol | 250 |
| Methyl isobutyl ketone | 750 |
| Sodium hydroxide | 1.8 |

It is to be understood in compounding these electrolytes that, although the chemical definitions given have a very definite chemical meaning, it may happen that one or another of the said chemical compounds as used may be contaminated. Such contamination may be difficult to detect analytically and yet it is known in the art that it may be detrimental to the performance of the condenser.

In Fig. 4, the two comparative graphs indicate the progress of film formation versus leakage current in two different electrolytes—one electrolyte using water as a solvent and the other, substantially water-free acetone, the solute in both examples being of the same concentration and of the same constituents, to wit: phenol plus sodium hydroxide, as is set forth hereinbefore. It will be observed from these graphs that the formation in the non-aqueous electrolyte shown in graph 21 proceeds much faster and toward a much lower final leakage current than the formation in the aqueous electrolyte as shown in graph 22.

Another feature to be noted in connection with the operation of the novel capacitor pertains to the initial leak as observed after idling the respective condensers for a period of several hours. This leak, in the case of the capacitor with the novel non-aqueous electrolyte, is not much different from the one observed before idling, while the initial leak in the case of a capacitor with aqueous electrolyte is conspicuously increased.

Also, the novel capacitor, by virtue of the use of the non-aqueous electrolyte, is capable of operation at low ambient temperatures with relatively inexpensive, commercial-grade electrode metals such as aluminum and magnesium in place of the heretofore required tantalum-sulphate type of combination.

I have found that magnesium may be substituted for the aluminum as electrode material, in which case a capacitor will result having substantially the same characteristics as the aluminum capacitor.

Aside from possessing all the desirable features of known capacitors, my novel capacitor is most suitable for long and efficient service at low temperatures and also on alternating current power lines and the like.

This application is in part a continuation of my application for United States Letters Patent Serial No. 290,381, filed May 28, 1952, for Electrolyte and Novel Capacitor Utilizing the Same, now abandoned.

I claim:

1. An electrolyte for electrolytic capacitors, in which the components are present substantially in the following proportions: acetone, 350 grams; phenol, 150 grams, and sodium hydroxide, 0.128 gram.

2. An electrolyte for electrolytic capacitors, in which the components are present substantially in the following proportions: acetone, 375 grams; nonyl phenol, 125 grams, and sodium hydroxide, 0.19 gram.

3. An electrolyte for electrolytic capacitors, in which the components are present substantially in the following proportions: methyl ethyl ketone, 375 grams; nonyl phenol, 125 grams, and sodium hydroxide, 0.4 gram.

4. An electrolyte for electrolytic capacitors, in which the components are present substantially in the following proportions: methyl ethyl ketone, 325 grams; phenol, 175 grams, and sodium hydroxide, 0.224 gram.

5. An electrolyte for electrolytic capacitors, in which the components are present substantially in the following proportions: methyl isobutyl ketone, 750 grams; cresol, 250 grams; and sodium hydroxide, 1.8 grams.

6. An electrolytic capacitor for operation at low ambient temperatures and having stable, low-leakage-current and low-power-loss properties, said capacitor comprising electrodes, at least one of which is filmed, and a liquid, substantially anhydrous electrolyte consisting essentially of a substantially insulating oxy-hydrocarbon solvent means of a molecular structure having no free hydroxyl groups and containing oxygen in the molecule, and a solute comprising a mono-hydric phenol and an alkali metal compound, the mono-hydric phenol being in excess of the alkali metal compound.

7. For use in electrolytic capacitors: an electrolyte of predetermined specific resistance consisting essentially of a low conductivity oxy-hydrocarbon solvent component; and a solute comprising a mono-hydric phenol component and an alkali metal component, wherein the ratio of the concentrations of alkali metal to mono-hydric phenol, for a constant predetermined specific resistance, is a function of the ratio of concentrations of the mono-hydric phenol to the solvent component, said function having an extremum which corresponds to suitable proportions of said components of the electrolyte.

8. An electrolyte according to claim 7, wherein the minimum of the function corresponds to the relative proportions of said components.

9. An electrolyte according to claim 7, wherein the maximum of the function corresponds to the relative proportions of said components.

10. An electrolytic capacitor having an electrode formed of a filmable metal and an electrolyte consisting essentially of three components including an oxy-hydrocarbon solvent, a weak organic acid and an alkali base free from nitrogen in predetermined proportions, the locus of the percent of base to acid with respect to the percent of acid to solvent at which different mixtures thereof result in optimum performance for a specified resistance of the electrolyte plotted with respect to rectangular coordinates, respectively, having a tangent parallel to one of said axes, the point of tangency corresponding to the proportions of said components for optimum performance.

11. An electrolytic capacitor having an electrode formed of a filmable metal and an electrolyte consisting essentially of three components including an oxy-hydrocarbon solvent, a weak organic acid and an alkali base free from nitrogen in predetermined proportions, the locus of the percent of base to acid with respect to the percent of acid to solvent at which different mixtures thereof result in optimum performance for a specified resistance of the electrolyte plotted with respect to rectangular coordinates, respectively, having a tangent parallel to the abscissae axis, the point of tangency corresponding to the proportions of said components for optimum performance.

12. An electrolyte for the purpose of forming and maintaining anodized films on electrolytic capacitor electrodes consisting essentially of an anhydrous substantially insulating oxy-hydrocarbon solvent and a binary solute neither of the components of which by itself forms with the solvent an electrolyte having adequate conductivity for the foregoing purposes, said solute comprising a mono-hydric phenol in relatively major concentration and an alkali metal in relatively minor concentration, the relative proportions between said acid component and alkali metal component being of the order of from 50 to 1 to 1150 to 1.

13. An electrolyte according to claim 12 wherein the mono-hydric phenol is between 5% and 90% of the total composition.

14. An electrolyte for electrolytic capacitors consisting essentially of an anhydrous, substantially insulating organic solvent comprising a ketone having not over 13 carbon atoms in its molecule, and a binary solute, neither of the components of which will, individually, render the electrolyte adequately conductive, one solute component being a mono-hydric phenol, the percentage, by weight, of phenol to solvent being within the range of 5% to 90%, and the other solute component being an alkali metal compound, the percentage, by weight, of said metal compound to phenol being within the range of 0.03% to 0.6%.

15. An electrolyte according to claim 14, wherein the ketones are of the lower molecular weight group consisting of acetone, methyl ethyl ketone and methyl isobutyl ketone.

16. An electrolyte according to claim 14, wherein the alkali metal compound is sodium hydroxide.

17. An electrolyte for electrolytic capacitors consisting essentially of a ketone having not over five carbon atoms, a mono-hydric phenol, and a compound of sodium, the amount of sodium being not over 32 milligrams per gram of mono-hydric phenol.

18. An electrolyte for electrolytic capacitors in which the components are present substantially in the following proportions: acetone, 350 grams; cresol, 150 grams; and sodium hydroxide, 0.128 gram.

References Cited in the file of this patent

UNITED STATES PATENTS

| 2,024,210 | Edelman | Dec. 17, 1935 |
| 2,031,793 | Robinson | Feb. 25, 1936 |
| 2,036,669 | Yngve | Apr. 7, 1936 |
| 2,089,683 | Clark | Aug. 10, 1937 |